(12) United States Patent
Okada (10) Patent No.: US 9,903,278 B2
(45) Date of Patent: Feb. 27, 2018

(54) CONTROL APPARATUS FOR ESTIMATING OPERATING PARAMETER OF A GAS-TURBINE AEROENGINE

(71) Applicant: HONDA MOTOR CO., LTD., Tokyo (JP)

(72) Inventor: Taizo Okada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 452 days.

(21) Appl. No.: 14/689,298

(22) Filed: Apr. 17, 2015

(65) Prior Publication Data
US 2016/0305336 A1 Oct. 20, 2016

(51) Int. Cl.
F02C 9/18 (2006.01)
F02C 3/107 (2006.01)

(52) U.S. Cl.
CPC ............... *F02C 9/18* (2013.01); *F02C 3/107* (2013.01); *F05D 2260/821* (2013.01)

(58) Field of Classification Search
CPC ...... F02C 9/18; F02C 9/20; F02C 9/26; F02C 9/28; F02C 9/285; F02C 3/107; F02C 6/08; F05D 2260/821; F05D 2270/304; F05D 2270/02; F05D 2270/021; F05D 2270/022; F05D 2270/023; F05D 2270/024
USPC ................. 60/773, 782, 785, 795; 701/31.7; 700/290
See application file for complete search history.

(56) References Cited

U.S. PATENT DOCUMENTS

| | | | | |
|---|---|---|---|---|
| 6,557,400 B2* | 5/2003 | Xiong | ................... | F01D 17/105 701/100 |
| 7,818,970 B2* | 10/2010 | Price | ....................... | F01D 15/10 60/39.281 |
| 7,983,829 B2* | 7/2011 | Muramatsu | ........... | F01D 21/003 701/100 |
| 9,068,463 B2* | 6/2015 | Pandey | ..................... | F02C 9/00 |

FOREIGN PATENT DOCUMENTS

JP 2006-009684 1/2006

* cited by examiner

*Primary Examiner* — Phutthiwat Wongwian
*Assistant Examiner* — Loren Edwards
(74) *Attorney, Agent, or Firm* — Rankin, Hill & Clark LLP (57) ABSTRACT

An apparatus for estimating operating parameter of a gas-turbine aeroengine is configured to calculate a rotational speed of the low-pressure turbine (N1) by retrieving preset first characteristics by at least a rotational speed of the high-pressure turbine (N2), an engine inlet temperature and a first amount of bled air, to calculate a compensating value (ΔN1) of the rotational speed of the low-pressure turbine by retrieving preset second characteristics by at least a second amount of bled air, and to calculate the rotational speed of the low-pressure turbine (N1) finally based on the calculated rotational speed of the low-pressure turbine (N1) and the compensating value (ΔN1) thereof.

20 Claims, 3 Drawing Sheets

CONTROL APPARATUS FOR ESTIMATING OPERATING PARAMETER OF A GAS-TURBINE AEROENGINE

BACKGROUND OF THE INVENTION

Field of the Invention

An embodiment of this invention relates to control apparatus for estimating operating parameter of a gas-turbine aeroengine.

Description of the Related Art

A gas-turbine aeroengine is typically equipped with at least a high-pressure turbine rotated by injection of high-pressure gas produced upon ignition and combustion of an air-fuel mixture in a combustion chamber and with a low-pressure turbine located downstream of the high-pressure turbine to be rotated by low-pressure gas exiting the high-pressure turbine. Such a gas-turbine aeroengine is provided with sensors or detectors for detecting numerous operating parameters used to control the engine, including a low-pressure turbine rotational speed N1, a high-pressure turbine rotational speed N2, and an outlet pressure P3 of a high-pressure compressor connected to the high-pressure turbine.

As the control is disturbed by abnormalities arising in these sensors, each or a relatively important one of the sensors is preferably monitored for malfunctioning by estimating (calculating) the operating parameter based on the output(s) of the other sensor(s) and comparing the estimated operating parameter with the outputs of the sensor(s).

Therefore, as taught by Japanese Laid-Open Patent Application No. 2006-9684 (Patent Document 1), it has been proposed to use the relationship between the outputs of the high-pressure turbine rotational speed sensor and an intake air temperature sensor to calculate an estimated value of the low-pressure turbine rotational speed N1 as an operating parameter and to discriminate the normality of the low-pressure turbine rotational speed sensor by comparing the calculated operating parameter with the output of the low-pressure turbine rotational speed sensor.

SUMMARY OF THE INVENTION

Aside from the above, since some of the compressed air flowing through a compression passage of the high-pressure compressor is bled off through a bleed off valve and discharged into the duct, the operating parameters can be affected by the amount of bleed air. However, the technique set forth in Patent Document 1 does not take the bleed air amount into account in estimating the operating parameter of the engine.

Therefore, an object of this invention is to resolve the aforesaid issue by providing a control apparatus for estimating operating parameter of a gas-turbine aeroengine which takes the bleed air amount into account in estimating the operating parameter of the engine.

In order to achieve the object, this invention provides in its first aspect an apparatus for estimating operating parameter of a gas-turbine aeroengine mounted on an aircraft and having at least a high-pressure turbine rotated by injection of high-pressure gas produced upon ignition and combustion of an air-fuel mixture in a combustion chamber, and a low-pressure turbine located downstream of the high-pressure turbine to be rotated by low-pressure gas exiting the high-pressure turbine, comprising: a high-pressure turbine rotational speed sensor adapted to detect a rotational speed of the high-pressure turbine (N2); an engine inlet temperature sensor adapted to detect an inlet temperature of the engine (T1); a first bleed off valve position sensor adapted to detect a first amount of bled air flowing through a high-pressure compressor connected to the high-pressure turbine and bled through a first bleed off valve; a second bleed off valve position sensor adapted to detect a second amount of bled air flowing through the high-pressure compressor connected to the high-pressure turbine and bled through a second bleed off valve; a low-pressure turbine rotational speed calculator that calculates a rotational speed of the low-pressure turbine (N1) by retrieving preset first characteristics by at least the rotational speed of the high-pressure turbine (N2) detected by the high-pressure turbine rotational speed sensor, the inlet temperature of the engine (T1) detected by the engine inlet temperature sensor and the first amount of bled air detected by the first bleed off valve position sensor; a low-pressure turbine rotational speed compensating value calculator that calculates a compensating value ($\Delta N1$) of the rotational speed of the low-pressure turbine (N1) by retrieving preset second characteristics by at least the second amount of bled air detected by the second bleed off valve position sensor; and a final low-pressure turbine rotational speed calculator that calculates the rotational speed of the low-pressure turbine (N1) finally based on the rotational speed of the low-pressure turbine (N1) calculated by the low-pressure turbine rotational speed calculator and the compensating value ($\Delta N1$) calculated by the low-pressure turbine rotational speed compensating value calculator.

In order to achieve the object, this invention provides in its second aspect an apparatus for estimating operating parameter of a gas-turbine aeroengine mounted on an aircraft and having at least a high-pressure turbine rotated by injection of high-pressure gas produced upon ignition and combustion of an air-fuel mixture in a combustion chamber, and a low-pressure turbine located downstream of the high-pressure turbine to be rotated by low-pressure gas exiting the high-pressure turbine, comprising: a high-pressure turbine rotational speed sensor adapted to detect a rotational speed of the high-pressure turbine (N2); an engine inlet temperature sensor adapted to detect an inlet temperature of the engine (T1); a first bleed off valve position sensor adapted to detect a first amount of bled air flowing through a high-pressure compressor connected to the high-pressure turbine and bled through a first bleed off valve; a second bleed off valve position sensor adapted to detect a second amount of bled air flowing through the high-pressure compressor connected to the high-pressure turbine and bled through a second bleed off valve; a compressor outlet pressure calculator that calculates a corrected rotational speed of the high-pressure turbine (N2K1) corrected by the inlet temperature of the engine (T1) based on the rotational speed of the high-pressure turbine (N2) detected by the high-pressure turbine rotational speed sensor and the inlet temperature of the engine (T1) detected by the engine inlet temperature sensor, and calculates an outlet pressure of the high-pressure compressor (P3) by retrieving preset first characteristics by at least the calculated corrected rotational speed of the high-pressure turbine (N2K1) and the first amount of bled air detected by the first bleed off valve position sensor; a first compressor outlet pressure compensating value calculator that calculates a compensating value ($\Delta P3$) of the outlet pressure of the high-pressure compressor (P3) by retrieving preset second characteristics by at least the second amount of bled air detected by the second bleed off valve position sensor; and a final compressor outlet pressure calculator that calculates the outlet pressure of the high-pressure compressor (P3) finally based on the outlet pressure of the high-pressure compressor (P3) calculated by the compressor outlet pressure calculator and the compensating value ($\Delta P3$) calculated by the first compressor outlet pressure compensating value calculator.

BRIEF DESCRIPTION OF DRAWINGS

The above and other objects and advantages of the invention will be more apparent from the following description and drawings in which.

DESCRIPTION OF EMBODIMENT

An embodiment of an apparatus for estimating operating parameter of a gas-turbine aeroengine according to the present invention will now be explained with reference to the attached drawings.

Figure 1:
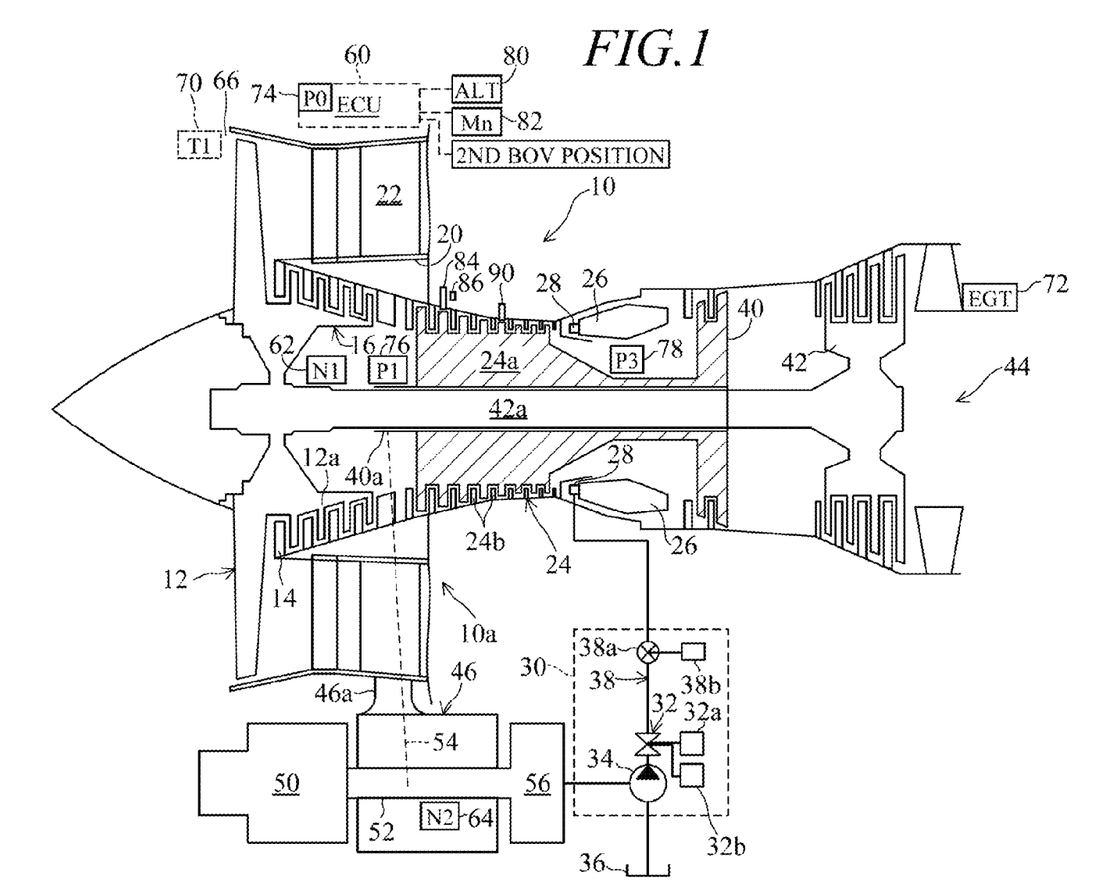
FIG. 1 is an overall schematic view of an apparatus for estimating operating parameter of a gas-turbine aeroengine.

FIG. 1 is an overall schematic view of the apparatus for estimating operating parameter of a gas-turbine aeroengine.

Four types of gas-turbine aeroengines are known: the turbojet engine, turbofan engine, turboprop engine and turboshaft engine. A two-shaft turbofan engine will be taken as an example in the following explanation.

In FIG. 1, reference numeral 10 designates the turbofan engine (gas turbine engine; hereinafter referred to as "engine"). Reference numeral 10a designates a main engine unit. Two of the engines 10 are installed, one on either side of an aircraft (whose airframe is not shown).

The engine 10 is equipped with a fan (fan blades) 12 that sucks in external air while rotating rapidly. A rotor 12a is formed integrally with the fan 12. The rotor 12a and a stator 14 facing it together form a low-pressure compressor 16 that compresses the sucked-in air and pumps it rearward.

A duct (bypass) 22 is formed in the vicinity of the fan 12 by a separator 20. Most of the air pulled in passes through the duct 22 to be jetted rearward of the engine without being burned at a later stage (in the core). The wind from the fan 12 produces a force of reaction that acts on the airframe (not shown) on which the engine 10 is mounted as a propulsive force (thrust). Most of the propulsion is produced by the air flow from the fan.

The air compressed by the low-pressure compressor 16 flows rearward to a high-pressure compressor 24 where it is further compressed by a rotor 24a and stator 24b and then flows rearward to a combustion chamber 26.

The combustion chamber 26 is equipped with a fuel nozzle 28 that is supplied with pressurized fuel metered by an FCU (fuel control unit) 30. The FCU 30 is equipped with a fuel metering valve (FMV) 32. Fuel pumped by a fuel pump 34 from a fuel tank 36 located at an appropriate part of the airframe is metered by the fuel metering valve 32 and supplied to the fuel nozzle 28 through a fuel supply line 38.

The fuel metering valve 32 is connected to a torque motor 32a to be opened/closed thereby. The position of the fuel metering valve 32 is detected by a nearby valve position sensor 32b. A fuel shutoff valve (SOV) 38a is interposed in the fuel supply line 38. The fuel shutoff valve 38a is connected to an electromagnetic solenoid 38b to be opened/closed thereby.

The fuel nozzle 28 sprays the fuel supplied through the fuel supply line 38.

The fuel sprayed from the fuel nozzle 28 and compressed air supplied from the high-pressure compressor 24 are mixed in the combustion chamber 26 and the air-fuel mixture is burned after being ignited at engine starting by an ignition unit (not shown) comprising an exciter and a sparkplug. Once the air-fuel mixture begins to burn, the air-fuel mixture composed of compressed air and fuel is continuously supplied and burned.

The hot high-pressure gas produced by the combustion is sent to a high-pressure turbine 40 to rotate it at high speed. The high-pressure turbine 40 is connected to the rotor 24a of the high-pressure compressor 24 through a high-pressure turbine shaft 40a to rotate the rotor 24a.

After driving the high-pressure turbine 40, the hot high-pressure gas is sent to a low-pressure turbine 42 to rotate it at relatively low speed. The low-pressure turbine 42 is connected to the rotor 12a of the low-pressure compressor 16 through a low-pressure turbine shaft 42a (in a dual concentric structure with the shaft 40a), so as to rotate the rotor 12a and fan 12. The gas having passed through the high-pressure turbine 40 is lower in pressure than gas jetted from the combustion chamber 26.

The exhaust gas exiting the low-pressure turbine 42 (turbine exhaust gas) is mixed with the fan exhaust air passing as is through the duct 22 and jetted together rearward of the engine 10 through a jet nozzle 44.

An accessory drive gearbox (hereinafter referred to as "gearbox") 46 is attached to the outer undersurface at the front end of the main engine unit 10a through a stay 46a. An integrated starter/generator (hereinafter called "starter") 50 is attached to the front of the gearbox 46. The FCU 30 is located at the rear of the gearbox 46.

At starting of the engine 10, the starter 50 rotates a shaft 52 whose rotation is transmitted through a drive shaft 54 (and a gear mechanism including a bevel gear etc. (not shown)) to the high-pressure turbine shaft 40a to generate compressed air. The generated compressed air is supplied to the combustion chamber 26, as mentioned above.

The rotation of the shaft 52 is also transmitted to a PMA (permanent magnet alternator) 56 and the (high-pressure) fuel pump 34, whereby, as explained above, the fuel pump 34 is driven to supply metered fuel to the fuel nozzle 28 so as to be mixed with compressed air and atomized. The resulting air-fuel mixture is ignited to start combustion.

When the engine 10 reaches self-sustaining operating speed, the rotation of the high-pressure turbine shaft 40a is transmitted back to the shaft 52 through the drive shaft 54 (and the gear mechanism including the bevel gear etc. (not shown)) to drive the fuel pump 34 and also drive the PMA 56 and starter 50.

As a result, the PMA 56 generates electricity and the starter 50 also generates electricity to be supplied to the airframe. Therefore, particularly when the electrical load on the airframe side increases, power generated by the starter 50 increases and rotational load on the high-pressure turbine shaft increases, thereby affecting the high-pressure turbine rotational speed, as will be explained later.

An ECU (Electronic Control Unit) 60 is installed at an upward location of the main engine unit 10a. The ECU 60 is equipped with a microcomputer comprising a CPU, ROM, RAM, I/O etc. (none of which are shown) and is housed in a container for mounting at the upward position.

An N1 sensor (rotational speed sensor) 62 is installed near the low-pressure turbine shaft 42a of the engine 10 and outputs a signal indicating the rotational speed of the low-pressure turbine (rotational speed of the low-pressure turbine shaft 42a) N1 (so as to detect the speed N1), and an N2 sensor (rotational speed sensor) 64 is installed near the shaft 52 and outputs a signal indicating the rotational speed of the high-pressure turbine (rotational speed of the high-pressure turbine shaft 40a) (so as to detect the speed N2).

A T1 sensor (temperature sensor) 70 installed near an air intake 66 at the front of the main engine unit 10a outputs a signal indicating the engine inlet temperature (ambient or intake temperature) T1 (so as to detect the temperature the temperature T1). An EGT sensor (exhaust gas temperature sensor) 72 installed at a suitable location downstream of the low-pressure turbine 42 outputs a signal indicating the exhaust gas temperature (low-pressure turbine outlet temperature) EGT (so as to detect the temperature EGT).

A P0 sensor (pressure sensor) 74 installed inside the container that houses the ECU 60 outputs a signal indicating atmospheric pressure P0 (so as to detect the pressure P0), and a P1 sensor (pressure sensor) 76 installed near the air intake 66 outputs a signal indicating engine inlet pressure (air intake pressure) P1 (so as to detect the inlet pressure P1 of the engine 10). In addition, a P3 sensor 78 installed downstream of the high-pressure compressor 24 outputs a signal indicating compressor outlet pressure (outlet pressure of the high-pressure compressor 24) P3 (so as to detect the pressure P3).

The outputs of the foregoing sensors indicating the operating condition of the engine 10 are sent to the ECU 60.

On the airframe side are installed a flight altitude sensor 80 that produces an output indicating the flight altitude ALT of the aircraft (so as to detect the flight altitude ALT) and a flight speed sensor 82 that produces an output indicating the flight speed Mn (Mach Number) of the aircraft (so as to detect the speed Mn). The outputs of these sensors are also sent to the ECU 60 comprising a computer on the airframe side.

The high-pressure compressor 24 is equipped with a first BOV (Bleed Off Valve) 84 at a location of its front stage. During starting, low-speed operation and the like of the engine 10, some of the compressed air flowing through a compression passage of the high-pressure compressor 24 is bled off through the first BOV 84 and discharged into the duct 22.

The first BOV 84 is opened and closed by an electromagnetic solenoid valve operated by commands from the ECU 60. A BOV position sensor 86 installed near the first BOV 84 to produce and send to the ECU 60 a signal indicating the amount of bled air bled through the first BOV 84 based on the position (opening angle) of the first BOV 84 (so as to detect the bleed air amount).

In addition, the high-pressure compressor 24 is equipped with a second BOV (Bleed Off Valve) 90 at a location downstream of the first BOV 84, and some of the compressed air flowing through a compression passage of the high-pressure compressor 24 is bled off through the second BOV 90 and sent to the cabin etc. on the airframe side for airframe cabin pressurization, air conditioning, wing de-icing, air sealing and other purposes.

The second BOV 90 is opened and closed by an electromagnetic solenoid valve in response to manual operation of a switch by a pilot seated in the cockpit of the airframe. An airframe side computer sends the ECU 60 a signal indicating the switch operation, i.e., the position of the second BOV 90. The ECU 60 determines whether second BOV 90 is opened or not, more broadly it determines the amount of air passing through the high-pressure compressor 24 and bled through the second BOV 90 based on the position of the second BOV 90.

Further, the ECU 60 is responsive to the position of a thrust lever operated by the pilot for controlling the operation of the torque motor 32a to open/close the fuel metering valve 32 and for energizing/de-energizing the electromagnetic solenoid 38b to open/close the fuel shutoff valve 38a and control supply of fuel to the fuel nozzle 28.

Furthermore, the ECU 60 estimates operating parameters of the engine 10.

Figure 2:
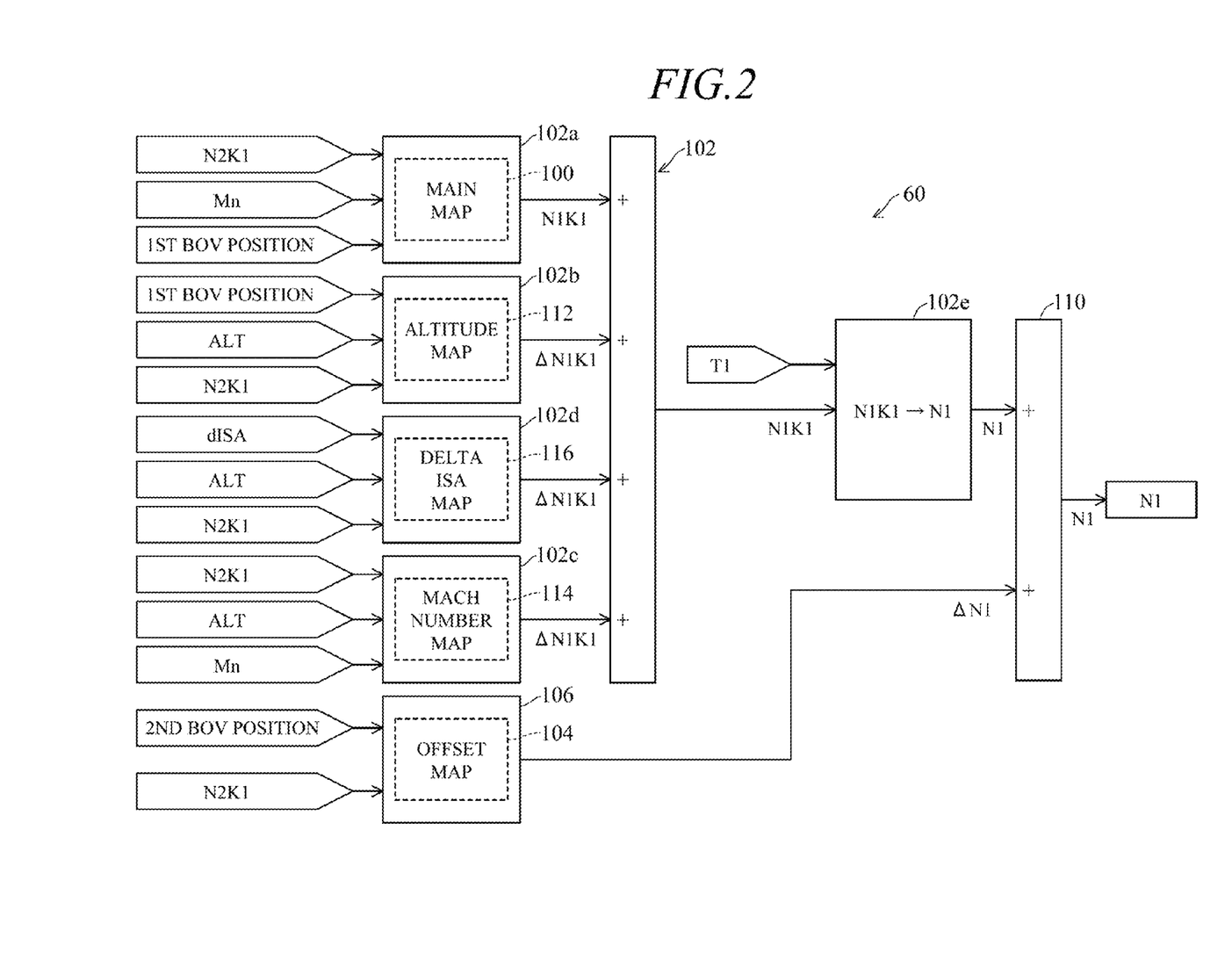
FIG. 2 is a block diagram for explaining operation of the apparatus.

FIG. 2 is a block diagram for functionally explaining such operation (processing) of the apparatus, more specifically the ECU 60. The illustrated processing is executed at predetermined time intervals.

Explaining the processing with reference to FIGS. 1 and 2, the apparatus is configured to be connected with the N2 sensor (high-pressure turbine rotational speed sensor) 64 adapted to detect the rotational speed of the high-pressure turbine 40 (N2), the TI sensor (engine inlet temperature sensor) 70 adapted to detect the inlet temperature of the engine 10 (T1), the first bleed off valve position sensor 86 adapted to detect a first amount of bled air flowing through the high-pressure compressor 24 connected to the high-pressure turbine 40 and bled through the first bleed off valve 84, the second bleed off valve position sensor (the ECU 60 itself) adapted to detect a second amount of bled air flowing through the high-pressure compressor 24 connected to the high-pressure turbine 40 and bled through a second bleed off valve 90, and the ECU 60 is configured to have a low-pressure turbine rotational speed calculator (calculating block) 102 that calculates the rotational speed of the low-pressure turbine 42 (N1) by retrieving preset first characteristics (main map) 100 by at least the rotational speed of the high-pressure turbine 24 (N2) detected by the N2 sensor (high-pressure turbine rotational speed sensor) 64, the inlet temperature of the engine 10 (T1) detected by the T1 sensor (engine inlet temperature sensor) 70 and the first amount of bled air detected by the first bleed off valve position sensor 86 (more specifically by the rotational speed of the high-pressure turbine 24 (N2), the inlet temperature of the engine 10 (T1), and the flight speed of the aircraft (Mn) detected by the flight speed sensor 82, the first amount of bled air), a low-pressure turbine rotational speed compensating value calculator (calculation block) 106 that calculates a compensating value ($\Delta N1$) of the rotational speed of the low-pressure turbine 42 (N1) by retrieving preset second characteristics (offset map) 104 by at least the second amount of bled air detected by the second bleed off valve position sensor (ECU 60 itself) (more specifically by the second amount of bled air and a corrected rotational speed of the high-pressure turbine 40 (N2K1)), and a final low-pressure turbine rotational speed calculator (calculating block) 110 that calculates the rotational speed of the low-pressure turbine 42 (N1) finally based on the rotational speed of the low-pressure turbine 42 (N1) calculated by the low-pressure turbine rotational speed calculator 102 and the compensating value ($\Delta N1$) calculated by the low-pressure turbine rotational speed compensating value calculator 106.

More specifically, the ECU 60 is configured such that the low-pressure turbine rotational speed calculator 102 includes: a corrected rotational speed calculator (calculating block) 102a that calculates a corrected rotational speed of the high-pressure turbine 40 (N2K1) corrected by the inlet temperature of the engine 10 (T1) based on the rotational speed of the high-pressure turbine 40 (N2) detected by the N2 sensor (high-pressure turbine rotational speed sensor) 64 and the inlet temperature of the engine 10 (T1) detected by the T1 sensor (engine inlet temperature sensor) 70, and calculates a corrected rotational speed of the low-pressure turbine 42 (N1K1) by retrieving the preset first characteristics 100 by at least the calculated corrected rotational speed of the high-pressure turbine (N2K1) and the first amount of bled air detected by the first bleed off valve position sensor 86 (more specifically by the calculated corrected rotational speed of the high-pressure turbine (N2K1), the first amount of bled air and the flight speed of the aircraft (Mn)), a first corrected rotational speed compensating value calculator (calculation block) 102*b* that calculates a compensating value (ΔN1K1) of the corrected rotational speed of the low-pressure turbine 42 (N1K1) by retrieving third preset characteristics (altitude map) 112 by at least a flight altitude of the aircraft (ALT) detected by the flight altitude sensor 80 (more specifically by the flight altitude of the aircraft (ALT), the calculated corrected rotational speed of the high-pressure turbine (N2K1) and the first amount of bled air), and a second corrected rotational speed compensating value calculator (calculating block) 102*c* that calculates the compensating value (ΔN1K1) of the corrected rotational speed of the low-pressure turbine 42 (N1K1) by retrieving fourth preset characteristics (mach number map) 114 by at least the flight speed of the aircraft (Mn) detected by the flight speed sensor 82 (more specifically by the flight speed of the aircraft (Mn), the calculated corrected rotational speed of the high-pressure turbine (N2K1) and the flight altitude of the aircraft (ALT)), and compensates the corrected rotational speed of the low-pressure turbine 42 (N1K1) calculated by the corrected rotational speed calculator 102*a* by the compensating values (ΔN1K1) calculated by the first and second corrected rotational speed compensating value calculators 102*b*, 102*c*.

Further, the ECU 60 is configured such that the low-pressure turbine rotational speed calculator 102 includes a third corrected rotational speed compensating value calculator (calculating block) 102*d* that calculates the compensating value (ΔN1K1) of the corrected rotational speed of the low-pressure turbine 42 (N1K1) by retrieving fifth preset characteristics (delta ISA map) 116 by at least a deviation from an ISA (International Standard Atmosphere) where the aircraft locates (dISA) (more specifically by the deviation from the ISA (dISA), the calculated corrected rotational speed of the high-pressure turbine (N2K1) and the flight altitude of the aircraft (ALT)), and compensates the corrected rotational speed of the low-pressure turbine 42 (N1K1) calculated by the corrected rotational speed calculator by the compensating values (ΔN1K1) calculated by the first, second and third corrected rotational speed compensating value calculators 102*b*, 102*c*, 102*d*.

The deviation (dISA) from the ISA is obtained based on information sent to the ECU 60 from the computer on the airframe side.

Further, the ECU 60 is configured such that the low-pressure turbine rotational speed calculator 102 includes a transformer (transforming block) 102*e* that inputs the compensating value (ΔN1K1) of the corrected rotational speed of the low-pressure turbine 42 (N1K1) and the inlet temperature of the engine 10 (T1) detected by the engine inlet temperature sensor 70 and transforms the corrected rotational speed of the low-pressure turbine 42 (N1K1) into the rotational speed of the low-pressure turbine 42 (N1), and outputs the transformed rotational speed of the low-pressure turbine 42 (N1).

The final low-pressure turbine rotational speed calculator 110 calculates the rotational speed of the low-pressure turbine 42 (N1) finally based on the rotational speed of the low-pressure turbine 42 (N1) transformed by the transformer 102*e* and the compensating value (ΔN1) calculated by the low-pressure turbine rotational speed compensating value calculator 106.

In FIG. 2, the first characteristics 100 is a three-dimensional map preset based on a bench test performed on the ground and is configured to be retrieved by the corrected rotational speed of the low-pressure turbine 42 (N2K1), the flight speed (Mn) and the first amount of bled air detected by the BOV position sensor 86 as illustrated.

Similarly, the second to fifth characteristics 104, 112, 114, 116 are three-dimensional maps preset based on bench tests performed on the ground and are configured to be retrieved by the associated operating parameters as illustrated.

Furthermore, the ECU 60 is configured to function as a low-pressure turbine rotational speed sensor normality discriminator that discriminates whether or not the N1 sensor (low-pressure turbine rotational speed sensor) 62 is normal by comparing the rotational speed of the low-pressure turbine 42 (N1) detected by the low-pressure turbine rotational speed sensor with the rotational speed of the low-pressure turbine (N1) calculated by the final low-pressure turbine rotational speed calculator.

Figure 3:
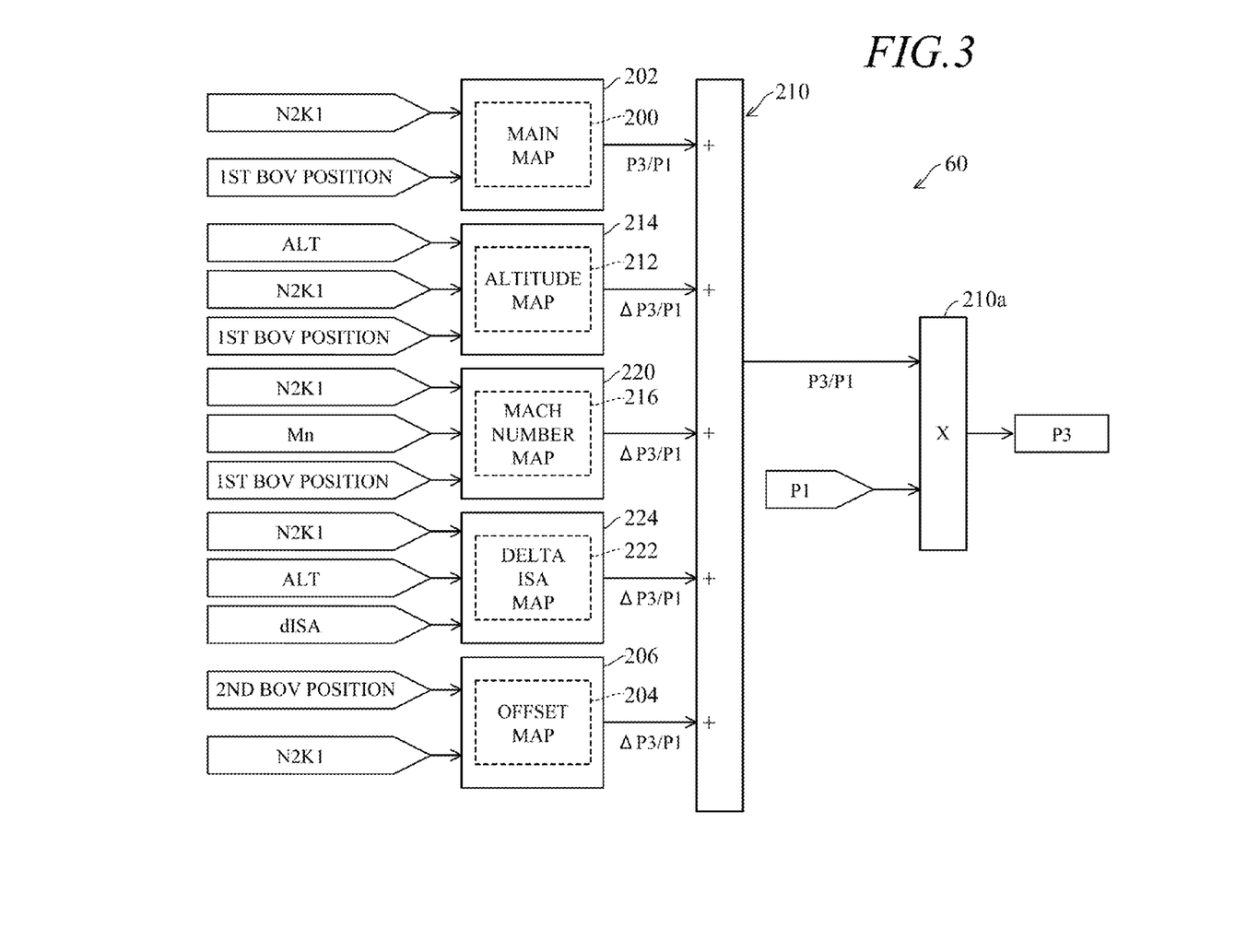
FIG. 3 is a block diagram similarly explaining operation of the apparatus.

FIG. 3 is a block diagram for functionally explaining another operation (processing) of the apparatus, more specifically the ECU 60.

Explaining this with reference to FIGS. 1 and 3, the ECU 60 is configured to be connected with the N2 sensor (high-pressure turbine rotational speed sensor) 64 adapted to detect the rotational speed of the high-pressure turbine 40 (N2), the T1 sensor (engine inlet temperature sensor) 70 adapted to detect the inlet temperature of the engine 10 (T1), the first bleed off valve position sensor 86 adapted to detect the first amount of bled air flowing through the high-pressure compressor 24 connected to the high-pressure turbine 40 and bled through the first bleed off valve 84, the second bleed off valve position sensor (ECU 60 itself) adapted to detect the second amount of bled air flowing through the high-pressure compressor 24 connected to the high-pressure turbine 40 and bled through the second bleed off valve 90, and is configured to have a compressor outlet pressure calculator (calculating block) 202 that calculates a corrected rotational speed of the high-pressure turbine 40 (N2K1) corrected by the inlet temperature of the engine 10 (T1) based on the rotational speed of the high-pressure turbine 40 (N2) detected by the high-pressure turbine rotational speed sensor 64 and the inlet temperature of the engine 10 (T1) detected by the engine inlet temperature sensor 70, and calculates the outlet pressure of the high-pressure compressor 40 (P3, more specifically P3/P1) by retrieving preset first characteristics (main map) 200 by at least the calculated corrected rotational speed of the high-pressure turbine 40 (N2K1) and the first amount of bled air detected by the first bleed off valve position sensor 86 (more specifically by the calculated corrected rotational speed of the high-pressure turbine 40 (N2K1) and the first amount of bled air), a first compressor outlet pressure compensating value calculator (calculating block) 206 that calculates a compensating value (ΔP3, more specifically ΔP3/P1) of the outlet pressure of the high-pressure compressor 24 (P3) by retrieving preset second characteristics (offset map) 204 by at least the second amount of bled air detected by the second bleed off valve position sensor (ECU 60 itself) (more specifically by the second amount of bled air and the calculated corrected rotational speed of the high-pressure turbine 40 (N2K1)), and a final compressor outlet pressure calculator (calculating block) 210 that calculates the outlet pressure of the high-pressure compressor 24 (P3, more specifically P3/P1) finally based on the outlet pressure of the high-pressure compressor 24 (P3) calculated by the compressor outlet pressure calculator 202 and the compensating value (ΔP3, more specifically ΔP3/P1) calculated by the first compressor outlet pressure compensating value calculator 206.

Further, the ECU 60 is configured to include a second compressor outlet pressure compensating value calculator (calculating block) 214 that calculates a compensating value (ΔP3, more specifically ΔP3/P1) of the outlet pressure of the high-pressure compressor 24 (P3) by retrieving third preset characteristics (altitude map) 212 by at least the flight altitude of the aircraft (ALT) (more specifically by the flight altitude of the aircraft (ALT), the calculated corrected rotational speed of the high-pressure turbine 40 (N2K1) and the first amount of bled air) and a third compressor outlet pressure compensating value calculator (calculating block) 220 that calculates the compensating value (ΔP3, more specifically ΔP3/P1) of the outlet pressure of the high-pressure compressor 24 (P3) by retrieving fourth preset characteristics (mach number maps) 216 by at least the flight speed of the aircraft (Mn) (more specifically by the flight speed of the aircraft (Mn), the calculated corrected rotational speed of the high-pressure turbine 40 (N2K1) and the first amount of bled air), and the final compressor outlet pressure calculator 210 calculates the outlet pressure of the high-pressure compressor 24 (P3, more specifically P3/P1) finally based on the outlet pressure of the high-pressure compressor 24 (P3, more specifically P3/P1) calculated by the compressor outlet pressure calculator 202 and the compensating values (ΔP3, more specifically ΔP3/P1) calculated by the first, second and third compressor outlet pressure compensating value calculators 206, 214, 220.

Further, the ECU 60 is configured to include a fourth compensator outlet pressure compensating value calculator (calculating block) 224 that calculates the compensating value (ΔP3, more specifically ΔP3/P1) of the outlet pressure of the high-pressure compressor 24 (P3) by retrieving fifth preset characteristics (delta ISA map) 222 by at least the deviation from the ISA where the aircraft locates (dISA) (more specifically by the deviation from the ISA (dISA), the calculated corrected rotational speed of the high-pressure turbine 40 (N2K1) and the flight altitude of the aircraft (ALT)), and the final compressor outlet pressure calculator 210 calculates the outlet pressure of the high-pressure compressor 24 (P3) finally based on the outlet pressure of the high-pressure compressor (P3, more specifically P3/P1) calculated by the compressor outlet pressure calculator 202 and the compensating values (ΔP3, more specifically ΔP3/P1) calculated by the first, second, third and fourth compressor outlet pressure compensating value calculators 206, 214, 220, 224.

Further, the ECU 60 is configured to include the P1 sensor (engine inlet pressure sensor) 76 adapted to detect the inlet pressure of the engine (P1), and the compressor outlet pressure calculator 202 calculates the outlet pressure of the high-pressure compressor 24 (P3) in terms of a ratio of the outlet pressure of the high-pressure compressor 24 (P3) relative to the detected inlet pressure of the engine 10 (P1).

Further, the compressor outlet pressure calculator 202 is configured to include a transformer (transforming block) 210a that inputs the inlet pressure of the engine 10 (P1) detected by the P1 sensor 76 and transforms into the outlet pressure of the high-pressure compressor 24 (P3) by multiplying the outlet pressure of the high-pressure compressor 24 (P3/P1) by the inputted value (P1).

Furthermore, the ECU 60 is configured to include the P3 sensor (compressor outlet pressure sensor) 78 adapted to detect the outlet pressure of the high-pressure compressor 24 (P3), and to function as a compressor outlet pressure sensor normality discriminator that discriminates whether or not the compressor outlet pressure sensor 78 is normal by comparing the outlet pressure of the high-pressure compressor 24 (P3) detected by the compressor outlet pressure sensor 78 with the outlet pressure of the high-pressure compressor 24 (P3) calculated by the final compressor outlet pressure calculator 210.

In FIG. 3, similar to the first characteristics 100 in FIG. 2, the first characteristics 200 is a three-dimensional map preset based on a bench test performed on the ground and is configured to be retrieved by the corrected rotational speed of the low-pressure turbine 42 (N2K1) and the first amount of bled air detected by the BOV position sensor 86 as illustrated.

Similarly, the second to fifth characteristics 204, 212, 216, 222 are three-dimensional maps preset based on bench tests performed on the ground and are configured to be retrieved by the associated operating parameters as illustrated. Also, the deviation (dISA) from the ISA is obtained based on information sent to the ECU 60 from the computer on the airframe side.

As stated above, the embodiment is configured to have an apparatus (and method) for estimating operating parameter(s) of a gas-turbine aeroengine (10) mounted on an aircraft and having at least a high-pressure turbine (40) rotated by injection of high-pressure gas produced upon ignition and combustion of an air-fuel mixture in a combustion chamber (26), and a low-pressure turbine (42) located downstream of the high-pressure turbine to be rotated by low-pressure gas exiting the high-pressure turbine, comprising: the N2 sensor (high-pressure turbine rotational speed sensor) 64 adapted to detect the rotational speed of the high-pressure turbine 40 (N2), the TI sensor (engine inlet temperature sensor) 70 adapted to detect the inlet temperature of the engine 10 (T1), the first bleed off valve position sensor 86 adapted to detect a first amount of bled air flowing through the high-pressure compressor 24 connected to the high-pressure turbine 40 and bled through the first bleed off valve 84, the second bleed off valve position sensor (the ECU 60 itself) adapted to detect a second amount of bled air flowing through the high-pressure compressor 24 connected to the high-pressure turbine 40 and bled through a second bleed off valve 90, and the ECU 60 is configured to have a low-pressure turbine rotational speed calculator (calculating block) 102 that calculates the rotational speed of the low-pressure turbine 42 (N1) by retrieving preset first characteristics (main map) 100 by at least the rotational speed of the high-pressure turbine 24 (N2) detected by the N2 sensor (high-pressure turbine rotational speed sensor) 64, the inlet temperature of the engine 10 (T1) detected by the T1 sensor (engine inlet temperature sensor) 70 and the first amount of bled air detected by the first bleed off valve position sensor 86, a low-pressure turbine rotational speed compensating value calculator (calculation block) 106 that calculates a compensating value (ΔN1) of the rotational speed of the low-pressure turbine 42 (N1) by retrieving preset second characteristics (offset map) 104 by at least the second amount of bled air detected by the second bleed off valve position sensor (ECU 60 it self), and a final low-pressure turbine rotational speed calculator (calculating block) 110 that calculates the rotational speed of the low-pressure turbine 42 (N1) finally based on the rotational speed of the low-pressure turbine 42 (N1) calculated by the low-pressure turbine rotational speed calculator 102 and the compensating value (ΔN1) calculated by the low-pressure turbine rotational speed compensating value calculator 106.

In the apparatus, the low-pressure turbine rotational speed calculator 102 includes: a corrected rotational speed calculator (calculating block) 102*a* that calculates a corrected rotational speed of the high-pressure turbine 40 (N2K1) corrected by the inlet temperature of the engine 10 (T1) based on the rotational speed of the high-pressure turbine 40 (N2) detected by the N2 sensor (high-pressure turbine rotational speed sensor) 64 and the inlet temperature of the engine 10 (T1) detected by the T1 sensor (engine inlet temperature sensor) 70, and calculates a corrected rotational speed of the low-pressure turbine 42 (N1K1) by retrieving the preset first characteristics 100 by at least the calculated corrected rotational speed of the high-pressure turbine (N2K1) and the first amount of bled air detected by the first bleed off valve position sensor 86, a first corrected rotational speed compensating value calculator (calculation block) 102*b* that calculates a compensating value (ΔN1K1) of the corrected rotational speed of the low-pressure turbine 42 (N1K1) by retrieving third preset characteristics (altitude map) 112 by at least a flight altitude of the aircraft (ALT) detected by the flight altitude sensor 80, and a second corrected rotational speed compensating value calculator (calculating block) 102*c* that calculates the compensating value (ΔN1K1) of the corrected rotational speed of the low-pressure turbine 42 (N1K1) by retrieving fourth preset characteristics (mach number map) 114 by at least the flight speed of the aircraft (Mn) detected by the flight speed sensor 82, and compensates the corrected rotational speed of the low-pressure turbine 42 (N1K1) calculated by the corrected rotational speed calculator 102*a* by the compensating values (ΔN1K1) calculated by the first and second corrected rotational speed compensating value calculators 102*b*, 102*c*.

In the apparatus, the low-pressure turbine rotational speed calculator 102 includes a third corrected rotational speed compensating value calculator (calculating block) 102*d* that calculates the compensating value (ΔN1K1) of the corrected rotational speed of the low-pressure turbine 42 (N1K1) by retrieving fifth preset characteristics (delta ISA map) 116 by at least a deviation from an ISA (International Standard Atmosphere) where the aircraft locates (dISA), and compensates the corrected rotational speed of the low-pressure turbine 42 (N1K1) calculated by the corrected rotational speed calculator by the compensating values (ΔN1K1) calculated by the first, second and third corrected rotational speed compensating value calculators 102*b*, 102*c*, 102*d*.

In the apparatus, the low-pressure turbine rotational speed calculator 102 includes a transformer (transforming block) 102*e* that inputs the compensating value (ΔN1K1) of the corrected rotational speed of the low-pressure turbine 42 (N1K1) and the inlet temperature of the engine 10 (T1) detected by the engine inlet temperature sensor 70 and transforms the corrected rotational speed of the low-pressure turbine 42 (N1K1) into the rotational speed of the low-pressure turbine 42 (N1), and outputs the transformed rotational speed of the low-pressure turbine 42 (N1), and the final low-pressure turbine rotational speed calculator 110 calculates the rotational speed of the low-pressure turbine 42 (N1) finally based on the rotational speed of the low-pressure turbine 42 (N1) transformed by the transformer 102*e* and the compensating value (ΔN1) calculated by the low-pressure turbine rotational speed compensating value calculator 106.

The apparatus includes a low-pressure turbine rotational speed sensor normality discriminator (the ECU 60) that discriminates whether or not the N1 sensor (low-pressure turbine rotational speed sensor) 62 is normal by comparing the rotational speed of the low-pressure turbine 42 (N1) detected by the low-pressure turbine rotational speed sensor with the rotational speed of the low-pressure turbine (N1) calculated by the final low-pressure turbine rotational speed calculator.

As stated above, the embodiment is configured to have an apparatus (and method) for estimating operating parameter(s) of a gas-turbine aeroengine (10) mounted on an aircraft and having at least a high-pressure turbine (40) rotated by injection of high-pressure gas produced upon ignition and combustion of an air-fuel mixture in a combustion chamber (26), and a low-pressure turbine (42) located downstream of the high-pressure turbine to be rotated by low-pressure gas exiting the high-pressure turbine, comprising: the N2 sensor (high-pressure turbine rotational speed sensor) 64 adapted to detect the rotational speed of the high-pressure turbine 40 (N2), the T1 sensor (engine inlet temperature sensor) 70 adapted to detect the inlet temperature of the engine 10 (T1), the first bleed off valve position sensor 86 adapted to detect the first amount of bled air flowing through the high-pressure compressor 24 connected to the high-pressure turbine 40 and bled through the first bleed off valve 84, the second bleed off valve position sensor (ECU 60 itself) adapted to detect the second amount of bled air flowing through the high-pressure compressor 24 connected to the high-pressure turbine 40 and bled through the second bleed off valve 90, and is configured to have a compressor outlet pressure calculator (calculating block) 202 that calculates a corrected rotational speed of the high-pressure turbine 40 (N2K1) corrected by the inlet temperature of the engine 10 (T1) based on the rotational speed of the high-pressure turbine 40 (N2) detected by the high-pressure turbine rotational speed sensor 64 and the inlet temperature of the engine 10 (T1) detected by the engine inlet temperature sensor 70, and calculates the outlet pressure of the high-pressure compressor 40 (P3, more specifically P3/P1) by retrieving preset first characteristics (main map) 200 by at least the calculated corrected rotational speed of the high-pressure turbine 40 (N2K1) and the first amount of bled air detected by the first bleed off valve position sensor 86, a first compressor outlet pressure compensating value calculator (calculating block) 206 that calculates a compensating value (ΔP3, more specifically ΔP3/P1) of the outlet pressure of the high-pressure compressor 24 (P3) by retrieving preset second characteristics (offset map) 204 by at least the second amount of bled air detected by the second bleed off valve position sensor (ECU 60 itself), and a final compressor outlet pressure calculator (calculating block) 210 that calculates the outlet pressure of the high-pressure compressor 24 (P3, more specifically P3/P1) finally based on the outlet pressure of the high-pressure compressor 24 (P3) calculated by the compressor outlet pressure calculator 202 and the compensating value (ΔP3, more specifically ΔP3/P1) calculated by the first compressor outlet pressure compensating value calculator 206.

The apparatus further includes a second compressor outlet pressure compensating value calculator (calculating block) 214 that calculates a compensating value (ΔP3, more specifically ΔP3/P1) of the outlet pressure of the high-pressure compressor 24 (P3) by retrieving third preset characteristics (altitude map) by at least the flight altitude of the aircraft (ALT), and a third compressor outlet pressure compensating value calculator (calculating block) 220 that calculates the compensating value (ΔP3, more specifically ΔP3/P1) of the outlet pressure of the high-pressure compressor 24 (P3) by retrieving fourth preset characteristics (mach number maps) by at least the flight speed of the aircraft (Mn), and the final compressor outlet pressure calculator 210 calculates the outlet pressure of the high-pressure compressor 24 (P3, more specifically P3/P1) finally based on the outlet pressure of the high-pressure compressor 24 (P3, more specifically P3/P1) calculated by the compressor outlet pressure calculator 202 and the compensating values (ΔP3, more specifically ΔP3/P1) calculated by the first, second and third compressor outlet pressure compensating value calculators 206, 214, 220.

The apparatus further includes a fourth compensator outlet pressure compensating value calculator (calculating block) 224 that calculates the compensating value (ΔP3, more specifically ΔP3/P1) of the outlet pressure of the high-pressure compressor 24 (P3) by retrieving fifth preset characteristics (delta ISA map) 222 by at least the deviation from the ISA where the aircraft locates (dISA), and the final compressor outlet pressure calculator 210 calculates the outlet pressure of the high-pressure compressor 24 (P3) finally based on the outlet pressure of the high-pressure compressor (P3, more specifically P3/P1) calculated by the compressor outlet pressure calculator 202 and the compensating values (ΔP3, more specifically ΔP3/P1) calculated by the first, second, third and fourth compressor outlet pressure compensating value calculators 206, 214, 220, 224.

The apparatus further includes the P1 sensor (engine inlet pressure sensor) 76 adapted to detect the inlet pressure of the engine (P1), and the compressor outlet pressure calculator 202 calculates the outlet pressure of the high-pressure compressor 24 (P3) in terms of a ratio of the outlet pressure of the high-pressure compressor 24 (P3) relative to the detected inlet pressure of the engine 10 (P1).

The apparatus further includes the P3 sensor (compressor outlet pressure sensor) 78 adapted to detect the outlet pressure of the high-pressure compressor 24 (P3), and a compressor outlet pressure sensor normality discriminator (the ECU 60 itself) that discriminates whether or not the compressor outlet pressure sensor 78 is normal by comparing the outlet pressure of the high-pressure compressor 24 (P3) detected by the compressor outlet pressure sensor 78 with the outlet pressure of the high-pressure compressor 24 (P3) calculated by the final compressor outlet pressure calculator 210.

While the invention has thus been shown and described with reference to a specific embodiment, it should be noted that the invention is in no way limited to the details of the described arrangements; changes and modifications may be made without departing from the scope of the appended claims.

What is claimed is:

1. An apparatus for estimating operating parameter of a gas-turbine aeroengine mounted on an aircraft and having at least a high-pressure turbine rotated by injection of high-pressure gas produced upon ignition and combustion of an air-fuel mixture in a combustion chamber, and a low-pressure turbine located downstream of the high-pressure turbine to be rotated by low-pressure gas exiting the high-pressure turbine, comprising:
    a high-pressure turbine rotational speed sensor adapted to detect a rotational speed of the high-pressure turbine (N2);
    an engine inlet temperature sensor adapted to detect an inlet temperature of the engine (T1);
    a first bleed off valve position sensor adapted to detect a first amount of bled air flowing through a high-pressure compressor connected to the high-pressure turbine and bled through a first bleed off valve;
    a second bleed off valve position sensor adapted to detect a second amount of bled air flowing through the high-pressure compressor connected to the high-pressure turbine and bled through a second bleed off valve;
    a low-pressure turbine rotational speed calculator configured to calculate a rotational speed of the low-pressure turbine (N1) by retrieving preset first characteristics by at least the rotational speed of the high-pressure turbine (N2) detected by the high-pressure turbine rotational speed sensor, the inlet temperature of the engine (T1) detected by the engine inlet temperature sensor and the first amount of bled air detected by the first bleed off valve position sensor;
    a low-pressure turbine rotational speed compensating value calculator configured to calculate a compensating value (ΔN1) of the rotational speed of the low-pressure turbine (N1) by retrieving preset second characteristics by at least the second amount of bled air detected by the second bleed off valve position sensor; and
    a final low-pressure turbine rotational speed calculator configured to calculate the rotational speed of the low-pressure turbine (N1) finally based on the rotational speed of the low-pressure turbine (N1) calculated by the low-pressure turbine rotational speed calculator and the compensating value (ΔN1) calculated by the low-pressure turbine rotational speed compensating value calculator.

2. The apparatus according to claim 1, wherein the low-pressure turbine rotational speed calculator includes:
    a corrected rotational speed calculator configured to calculate a corrected rotational speed of the high-pressure turbine (N2K1) corrected by the inlet temperature of the engine (T1) based on the rotational speed of the high-pressure turbine (N2) detected by the high-pressure turbine rotational speed sensor and the inlet temperature of the engine (T1) detected by the engine inlet temperature sensor, and calculates a corrected rotational speed of the low-pressure turbine (N1K1) by retrieving the preset first characteristics by at least the calculated corrected rotational speed of the high-pressure turbine (N2K1) and the first amount of bled air detected by the first bleed off valve position sensor;
    a first corrected rotational speed compensating value calculator configured to calculate a compensating value (ΔN1K1) of the corrected rotational speed of the low-pressure turbine (N1K1) by retrieving third preset characteristics by at least a flight altitude of the aircraft (ALT); and
    a second corrected rotational speed compensating value calculator configured to calculate the compensating value (ΔN1K1) of the corrected rotational speed of the low-pressure turbine (N1K1) by retrieving fourth preset characteristics by at least a flight speed of the aircraft (Mn); and
    compensates the corrected rotational speed of the low-pressure turbine (N1K1) calculated by the corrected rotational speed calculator by the compensating values (ΔN1K1) calculated by the first and second corrected rotational speed compensating value calculators.

3. The apparatus according to claim 2, wherein the low-pressure turbine rotational speed calculator includes:
    a third corrected rotational speed compensating value calculator configured to calculate the compensating value (ΔN1K1) of the corrected rotational speed of the low-pressure turbine (N1K1) by retrieving fifth preset characteristics by at least a deviation from an ISA where the aircraft locates (dISA);

and compensates the corrected rotational speed of the low-pressure turbine (N1K1) calculated by the corrected rotational speed calculator by the compensating values (ΔN1K1) calculated by the first, second and third corrected rotational speed compensating value calculators.

4. The apparatus according to claim 3, wherein the low-pressure turbine rotational speed calculator includes:

a transformer that inputs the compensating value (ΔN1K1) of the corrected rotational speed of the low-pressure turbine (N1K1) and the inlet temperature of the engine (T1) detected by the engine inlet temperature sensor and transforms the corrected rotational speed of the low-pressure turbine (N1K1) into the rotational speed of the low-pressure turbine (N1); and the final low-pressure turbine rotational speed calculator is configured to calculate the rotational speed of the low-pressure turbine (N1) finally based on the rotational speed of the low-pressure turbine (N1) transformed by the transformer and the compensating value (ΔN1) calculated by the low-pressure turbine rotational speed compensating value calculator.

5. The apparatus according to claim 1, wherein the low-pressure turbine rotational speed calculator includes:

a low-pressure turbine rotational speed sensor normality discriminator that discriminates whether or not a low-pressure turbine rotational speed sensor is normal by comparing the rotational speed of the low-pressure turbine (N1) detected by the low-pressure turbine rotational speed sensor with the rotational speed of the low-pressure turbine (N1) calculated by the final low-pressure turbine rotational speed calculator.

6. An apparatus for estimating operating parameter of a gas-turbine aeroengine mounted on an aircraft and having at least a high-pressure turbine rotated by injection of high-pressure gas produced upon ignition and combustion of an air-fuel mixture in a combustion chamber, and a low-pressure turbine located downstream of the high-pressure turbine to be rotated by low-pressure gas exiting the high-pressure turbine, comprising:

a high-pressure turbine rotational speed sensor adapted to detect a rotational speed of the high-pressure turbine (N2);

an engine inlet temperature sensor adapted to detect an inlet temperature of the engine (T1);

a first bleed off valve position sensor adapted to detect a first amount of bled air flowing through a high-pressure compressor connected to the high-pressure turbine and bled through a first bleed off valve;

a second bleed off valve position sensor adapted to detect a second amount of bled air flowing through the high-pressure compressor connected to the high-pressure turbine and bled through a second bleed off valve;

a compressor outlet pressure calculator configured to calculate a corrected rotational speed of the high-pressure turbine (N2K1) corrected by the inlet temperature of the engine (T1) based on the rotational speed of the high-pressure turbine (N2) detected by the high-pressure turbine rotational speed sensor and the inlet temperature of the engine (T1) detected by the engine inlet temperature sensor, and configured to calculate an outlet pressure of the high-pressure compressor (P3) by retrieving preset first characteristics by at least the calculated corrected rotational speed of the high-pressure turbine (N2K1) and the first amount of bled air detected by the first bleed off valve position sensor;

a first compressor outlet pressure compensating value calculator configured to calculate a compensating value (ΔP3) of the outlet pressure of the high-pressure compressor (P3) by retrieving preset second characteristics by at least the second amount of bled air detected by the second bleed off valve position sensor; and a final compressor outlet pressure calculator configured to calculate the outlet pressure of the high-pressure compressor (P3) finally based on the outlet pressure of the high-pressure compressor (P3) calculated by the compressor outlet pressure calculator and the compensating value (ΔP3) calculated by the first compressor outlet pressure 30 compensating value calculator.

7. The apparatus according to claim 6, further including:

a second compressor outlet pressure compensating value calculator configured to calculate a compensating value (ΔP3) of the outlet pressure of the high-pressure compressor (P3) by retrieving third preset characteristics by at least a flight altitude of the aircraft (ALT); and a third compressor outlet pressure compensating value calculator configured to calculate the compensating value (ΔP3) of the outlet pressure of the high-pressure compressor (P3) by retrieving fourth preset characteristics by at least a flight speed of the aircraft (Mn);

and the final compressor outlet pressure calculator is configured to calculate the outlet pressure of the high-pressure compressor (P3) finally based on the outlet pressure of the high-pressure compressor (P3) calculated by the compressor outlet pressure calculator and the compensating values (ΔP3) calculated by the first, second and third compressor outlet pressure compensating value calculators.

8. The apparatus according to claim 7, further including:

a fourth compensator outlet pressure compensating value calculator configured to calculate the compensating value (ΔP3) of the outlet pressure of the high-pressure compressor (P3) by retrieving fifth preset characteristics by at least a deviation from an ISA where the aircraft locates (dISA);

and the final compressor outlet pressure calculator is configured to calculate the outlet pressure of the high-pressure compressor (P3) finally based on the outlet pressure of the high-pressure compressor (P3) calculated by the compressor outlet pressure calculator and the compensating values (ΔP3) calculated by the first, second, third and fourth compressor outlet pressure compensating value calculators.

9. The apparatus according to claim 6, further including:

an engine inlet pressure sensor adapted to detect an inlet pressure of the engine (P1);

and the compressor outlet pressure calculator is configured to calculate the outlet pressure of the high-pressure compressor (P3) in terms of a ratio of the outlet pressure of the high-pressure compressor (P3) relative to the detected inlet pressure of the engine (P1).

10. The apparatus according to claim 6, further including:

a compressor outlet pressure sensor adapted to detect the outlet pressure of the high-pressure compressor (P3); and a compressor outlet pressure sensor normality discriminator that discriminates whether or not the compressor outlet pressure sensor is normal by comparing the outlet pressure of the high-pressure compressor (P3) detected by the compressor outlet pressure sensor with the outlet pressure of the high-pressure compressor (P3) calculated by the final compressor outlet pressure calculator.

11. A method for estimating operating parameter of a gas-turbine aeroengine mounted on an aircraft and having at least a high-pressure turbine rotated by injection of high-pressure gas produced upon ignition and combustion of an air-fuel mixture in a combustion chamber, a low-pressure turbine located downstream of the high-pressure turbine to be rotated by low-pressure gas exiting the high-pressure turbine, a high-pressure turbine rotational speed sensor adapted to detect a rotational speed of the high-pressure turbine (N2), an engine inlet temperature sensor adapted to detect an inlet temperature of the engine (T1), a first bleed off valve position sensor adapted to detect a first amount of bled air flowing through a high-pressure compressor connected to the high-pressure turbine and bled through a first bleed off valve, and a second bleed off valve position sensor adapted to detect a second amount of bled air flowing through the high-pressure compressor connected to the high-pressure turbine and bled through a second bleed off valve;

comprising the steps of:

calculating a rotational speed of the low-pressure turbine (N1) by retrieving preset first characteristics by at least the rotational speed of the high-pressure turbine (N2) detected by the high-pressure turbine rotational speed sensor, the inlet temperature of the engine (T1) detected by the engine inlet temperature sensor and the first amount of bled air detected by the first bleed off valve position sensor;

calculating a compensating value (ΔN1) of the rotational speed of the low-pressure turbine (N1) by retrieving preset second characteristics by at least the second amount of bled air detected by the second bleed off valve position sensor; and calculating the rotational speed of the low-pressure turbine (N1) finally based on the rotational speed of the low-pressure turbine (N1) calculated by the step of low-pressure turbine rotational speed calculating and the compensating value (ΔN1) calculated by the step of low-pressure turbine rotational speed compensating value calculating.

12. The method according to claim 11, wherein the step of low-pressure turbine rotational speed calculating includes:

calculating a corrected rotational speed of the high-pressure turbine (N2K1) corrected by the inlet temperature of the engine (T1) based on the rotational speed of the high-pressure turbine (N2) detected by the high-pressure turbine rotational speed sensor and the inlet temperature of the engine (T1) detected by the engine inlet temperature sensor, and calculating a corrected rotational speed of the low-pressure turbine (N1K1) by retrieving the preset first characteristics by at least the calculated corrected rotational speed of the high-pressure turbine (N2K1) and the first amount of bled air detected by the first bleed off valve position sensor;

calculating a compensating value (ΔN1K1) of the corrected rotational speed of the low-pressure turbine (N1K1) by retrieving third preset characteristics by at least a flight altitude of the aircraft (ALT); and calculating the compensating value (ΔN1K1) of the corrected rotational speed of the low-pressure turbine (N1K1) by retrieving fourth preset characteristics by at least a flight speed of the aircraft (Mn);

and compensating the corrected rotational speed of the low-pressure turbine (N1K1) calculated by the step of corrected rotational speed calculating by the compensating values (ΔN1K1) calculated by the steps of first and second corrected rotational speed compensating value calculating.

13. The method according to claim 12, wherein the step of low-pressure turbine rotational speed calculating includes:

calculating the compensating value (ΔN1K1) of the corrected rotational speed of the low-pressure turbine (N1K1) by retrieving fifth preset characteristics by at least a deviation from an ISA where the aircraft locates (dISA);

and compensating the corrected rotational speed of the low-pressure turbine (N1K1) calculated by the step of corrected rotational speed calculating by the compensating values (ΔN1K1) calculated by the steps of first, second and third corrected rotational speed compensating value calculating.

14. The method according to claim 13, wherein step of the low-pressure turbine rotational speed calculating includes the step of:

inputting the compensating value (ΔN1K1) of the corrected rotational speed of the low-pressure turbine (N1K1) and the inlet temperature of the engine (T1) detected by the engine inlet temperature sensor and transforming the corrected rotational speed of the low-pressure turbine (N1K1) into the rotational speed of the low-pressure turbine (N1);

and the step of final low-pressure turbine rotational speed calculating calculates the rotational speed of the low-pressure turbine (N1) finally based on the rotational speed of the low-pressure turbine (N1) transformed by the step of transforming and the compensating value (ΔN1) calculated by the step of low-pressure turbine rotational speed compensating value calculating.

15. The method according to claim 11, wherein the step of low-pressure turbine rotational speed calculating includes:

discriminating whether or not a low-pressure turbine rotational speed sensor is normal by comparing the rotational speed of the low-pressure turbine (N1) detected by the low-pressure turbine rotational speed sensor with the rotational speed of the low-pressure turbine (N1) calculated by the step of low-pressure turbine rotational speed calculating.

16. A method for estimating operating parameter of a gas-turbine aeroengine mounted on an aircraft and having at least a high-pressure turbine rotated by injection of high-pressure gas produced upon ignition and combustion of an air-fuel mixture in a combustion chamber, a low-pressure turbine located downstream of the high-pressure turbine to be rotated by low-pressure gas exiting the high-pressure turbine, a high-pressure turbine rotational speed sensor adapted to detect a rotational speed of the high-pressure turbine (N2), an engine inlet temperature sensor adapted to detect an inlet temperature of the engine (T1), a first bleed off valve position sensor adapted to detect a first amount of bled air flowing through a high-pressure compressor connected to the high-pressure turbine and bled through a first bleed off valve, a second bleed off valve position sensor adapted to detect a second amount of bled air flowing through the high-pressure compressor connected to the high-pressure turbine and bled through a second bleed off valve;

comprising the steps of:

calculating a corrected rotational speed of the high-pressure turbine (N2K1) corrected by the inlet temperature of the engine (T1) based on the rotational speed of the high-pressure turbine (N2) detected by the high-pressure turbine rotational speed sensor and the inlet temperature of the engine (T1) detected by the engine inlet temperature sensor, and calculating an outlet pressure of the high-pressure compressor (P3) by retrieving preset first characteristics by at least the calculated corrected rotational speed of the high-pressure turbine (N2K1) and the first amount of bled air detected by the first bleed off valve position sensor;

calculating a compensating value (ΔP3) of the outlet pressure of the high-pressure compressor (P3) by retrieving preset second characteristics by at least the second amount of bled air detected by the second bleed off valve position sensor; and calculating the outlet pressure of the high-pressure compressor (P3) finally based on the outlet pressure of the high-pressure compressor (P3) calculated by the step of compressor outlet pressure calculating and the compensating value (ΔP3) calculated by the step of first compressor outlet pressure compensating value calculating.

17. The method according to claim 16, further including the steps of:

calculating a compensating value (ΔP3) of the outlet pressure of the high-pressure compressor (P3) by retrieving third preset characteristics by at least a flight altitude of the aircraft (ALT); and calculating the compensating value (ΔP3) of the outlet pressure of the high-pressure compressor (P3) by retrieving fourth preset characteristics by at least a flight speed of the aircraft (Mn);

and the step of final compressor outlet pressure calculating calculates the outlet pressure of the high-pressure compressor (P3) finally based on the outlet pressure of the high-pressure compressor (P3) calculated by the step of compressor outlet pressure calculating and the compensating values (ΔP3) calculated by the steps of first, second and third compressor outlet pressure compensating value calculating.

18. The method according to claim 17, further including the step of:

calculating the compensating value (ΔP3) of the outlet pressure of the high-pressure compressor (P3) by retrieving fifth preset characteristics by at least a deviation from an ISA where the aircraft locates (dISA);

and the step of final compressor outlet pressure calculating calculates the outlet pressure of the high-pressure compressor (P3) finally based on the outlet pressure of the high-pressure compressor (P3) calculated by the step of compressor outlet pressure calculating and the compensating values (ΔP3) calculated by the steps of first, second, third and fourth compressor outlet pressure compensating value calculating.

19. The method according to claim 16, wherein the step of compressor outlet pressure calculating calculates the outlet pressure of the high-pressure compressor (P3) in terms of a ratio of the outlet pressure of the high-pressure compressor (P3) relative to the inlet pressure of the engine (P1) detected by an engine inlet pressure sensor.

20. The method according to claim 16, further including the step of:

discriminating whether or not the compressor outlet pressure sensor is normal by comparing the outlet pressure of the high-pressure compressor (P3) detected by a compressor outlet pressure sensor with the outlet pressure of the high-pressure compressor (P3) calculated by the step of final compressor outlet pressure calculating.

* * * * *